(12) United States Patent
Sengupta et al.

(10) Patent No.: US 7,908,365 B2
(45) Date of Patent: *Mar. 15, 2011

(54) SYSTEM USING FOOTPRINTS IN SYSTEM LOG FILES FOR MONITORING TRANSACTION INSTANCES IN REAL-TIME NETWORK

(75) Inventors: Bikram Sengupta, New Delhi (IN);
Nilanjan Banerjee, West Bengal (IN);
Arun Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/019,710

(22) Filed: Jan. 25, 2008

(65) Prior Publication Data

US 2009/0193112 A1    Jul. 30, 2009

(51) Int. Cl.
*G06F 15/173* (2006.01)
(52) U.S. Cl. ........................ 709/224; 709/223
(58) Field of Classification Search .................. 709/223, 709/224, 225; 705/67, 7; 707/1; 379/144.02; 718/101
See application file for complete search history.

(56) References Cited

U.S. PATENT DOCUMENTS

| | | | |
|---|---|---|---|
| 5,907,848 A | 5/1999 | Zaiken et al. | |
| 7,016,953 B2 | 3/2006 | Lemon | |
| 2002/0103663 A1 | 8/2002 | Bankier et al. | |
| 2003/0115334 A1 | 6/2003 | Bhat et al. | |
| 2004/0103193 A1 | 5/2004 | Pandya et al. | |
| 2004/0254890 A1* | 12/2004 | Sancho et al. | 705/67 |
| 2005/0114284 A1* | 5/2005 | Wrobel et al. | 707/1 |
| 2006/0010101 A1 | 1/2006 | Suzuki et al. | |
| 2007/0263812 A1* | 11/2007 | Polozola et al. | 379/144.02 |
| 2007/0266148 A1* | 11/2007 | Ruiz et al. | 709/224 |
| 2007/0266149 A1* | 11/2007 | Cobb et al. | 709/224 |
| 2009/0037914 A1* | 2/2009 | Chagoly et al. | 718/101 |
| 2009/0164270 A1* | 6/2009 | Seidman | 705/7 |
| 2009/0171707 A1* | 7/2009 | Bobak et al. | 705/7 |

OTHER PUBLICATIONS

Van Der Aalst W.M.P., Business alignment: using process mining as a tool for Delta analysis and conformance testing, Requirements engineering, 2005, pp. 198-211, vol. 10, n. 3.
"Network Monitoring Tools," http://www.slac.stanford.edu/xorg/nmtf/nmtf-tools.html#app, downloaded on Jan. 10, 2008.
"Website Monitoring," http://www.webmetrics.com/, downloaded on Jan. 10, 2008.
"Performance and Availability Monitoring," http://www.mercury.com/us/products/business-availability-center/end-user-management/, downloaded on Jan. 10, 2008.
"Tools for Database, Application and Windows Management," http://www.quest.com/foglight/, downloaded on Jan. 10, 2008.

(Continued)

*Primary Examiner* — Le Luu
(74) *Attorney, Agent, or Firm* — Ryan, Mason & Lewis, LLP

(57) ABSTRACT

Techniques for monitoring one or more transaction instances in a real-time network are provided. The techniques include obtaining one or more system log files, wherein one or more footprints left by one or more transaction instances are recorded in the one or more system log files, obtaining a transaction model, wherein the transaction model comprises one or more transaction steps and a footprint pattern corresponding with each transaction step, and using the one or more system log files and the transaction model to monitor the one or more transaction instances in a real-time network at least one of an individual level and one or more aggregate levels.

15 Claims, 8 Drawing Sheets

OTHER PUBLICATIONS

"Business Intelligence from Business Objects," http://www.businessobjects.com/, downloaded on Jan. 10, 2008.

"Business Intelligence and Performance Management Software Solutions from Cognos," http://www.cognos.com/, downloaded on Jan. 10, 2008.

"Business Technology Optimization (BTO) Software,"http://h20229.wwvv2.hp.com/, downloaded on Jan. 10, 2008.

"HP OpenView," http://www-306.ibm.com/software/tivoli/, downloaded on Jan. 10, 2008.

"Enterprise Systems Management Solutions from CA," http://wwvv3.ca.com/solutions/Solution.aspx?ID=315, downloaded on Jan. 10, 2008.

Van Der Aalst, W. et al., "Workflow Mining: Discovering Process Models from Event Logs," IEEE Transactions on Knowledge and Data Engineering, Sep. 2004.

Agrawal, R., "Mining Process Models from Workflow Logs," International Conference on Extending Database Technology: Advances in Database Technology, LNCS vol. 1377, Jan. 22, 1998.

"SLCT: Simple Logfile Clustering Tool," http://kodu.neti.e/~risto/sIct/, downloaded on Jan. 10, 2008.

"Application Response Measurement," http://www.opengroup.org/tech/management/arm/, downloaded on Jan. 10, 2008.

\* cited by examiner

Started: "Starting transaction <id>": ATM1.log
Verifying Information: "Verifying log-in information": ATM1.log
Correct Login: "Log-in successful for transaction <id>": ATM1.log
Incorrect Login: "Log-in failed for transaction <id>": ATM1.log
Second Attempt: "Trying again": ATM1.log
Incorrect Login Again: "Login failed again for transaction <id>": ATM1.log
Offered Services: "Offering banking services": ATM2.log
Performed Services: "Service performed": ATM2.log
Completed: "Transaction <id> completed": ATM2.log
Terminated: "Terminated": ATM2.log

FIG. 4

```
Input Transaction Model M
1.  while (true)
    {
2.    Read a log record r sent by the probe manager
3.    if (isStartingRecord(M, r))
      { //new transaction instance starting
4.      Generate new instance id tr_id;
5.      Create a new agent ag with id tr_id to monitor instance tr_id;
6.      Update Next table to account for ag and store token bindings;
      }
      else
7.    { Let s be the state whose footprint pattern matches r;
8.      Scan Next table to determine candidate agent set A and update token bindings if needed;
9.      Forward s to each agent in A along with information on all candidate agents for r;
10.     Wait for each agent ag in A to update Next table;
      }
    }
11. Periodically remove agents of terminated transaction instances from Agent pool and remove corresponding entries from Next table
12. Periodically log "possible" states of all active agents in appropriate repositories
```

```
Input transaction model M
1.  Possible_states(initially) = {s_init}, the initial state of model M 2.  While (true)
    {
3.      Receive a state s and candidate agents A from the Engine;

4.      if(notIn(possible_states, s)
5.      {   if(onlyCandidate(this))
6.          { possible_states = {s}
            }
7.          else
8.          { History(s).cnt = 1;
9.            History(s).candidates = A
10.           possible_states = possible_states ∪ {s}
            }
        }

11.     else
12.     { History(s).cnt++;
13.       Let us denote History(s).candidates as H;
14.       H = H ∪ (A-H);
15.       if (History(s).cnt = |H|)
16.       { Let S = {x in possible_states | x preceedes s OR x unreachable from s}
17.         possible_states = possible_states - S }
        }
18.     ST = next_states(possible_states)
19.     UpdateNext(ST)
    }
```

FIG. 6

>1. STARTING TRANSACTION 1
ATM#12.3.06#9:09:29PM: [Started]//id=1

>2. STARTING TRANSACTION 2
ATM#12.3.06#9:09:29PM: [Started]//id=1
ATM#12.3.06#9:09:32PM: [Started]//id=2

>3. VERIFYING LOG-IN INFORMATION
ATM#12.3.06#9:09:29PM: [Started] [Verifying_Information]
ATM#12.3.06#9:09:32PM: [Started] [Verifying_Information]

>4. VERIFYING LOG-IN INFORMATION
ATM#12.3.06#9:09:29PM: [Verifying_Information]
ATM#12.3.06#9:09:32PM: [Verifying_Information]

>5. STARTING TRANSACTION 3
ATM#12.3.06#9:09:29PM: [Verifying_Information]
ATM#12.3.06#9:09:32PM: [Verifying_Information]
ATM#12.3.06#9:09:38PM: [Started]//id=3

>6. STARTING TRANSACTION 4
ATM#12.3.06#9:09:29PM: [Verifying_Information]
ATM#12.3.06#9:09:32PM: [Verifying_Information]
ATM#12.3.06#9:09:38PM: [Started]
ATM#12.3.06#9:09:40PM: [Started]//id=4

>7. VERIFYING LOG-IN INFORMATION
ATM#12.3.06#9:09:29PM: [Verifying_Information]
ATM#12.3.06#9:09:32PM: [Verifying_Information]
ATM#12.3.06#9:09:38PM: [Started] [Verifying_Information]
ATM#12.3.06#9:09:40PM: [Started] [Verifying_Information]

>8. LOGIN FAILED FOR TRANSACTION 4
ATM#12.3.06#9:09:29PM: [Verifying_Information]
ATM#12.3.06#9:09:32PM: [Verifying_Information]
ATM#12.3.06#9:09:38PM: [Started] [Verifying_Information]
ATM#12.3.06#9:09:40PM: [Incorrect_Login]

US 7,908,365 B2

SYSTEM USING FOOTPRINTS IN SYSTEM LOG FILES FOR MONITORING TRANSACTION INSTANCES IN REAL-TIME NETWORK

CROSS-REFERENCE TO RELATED APPLICATION(S)

The present application is related to a commonly assigned U.S. application entitled "Method for Monitoring Transaction Instances," identified by Ser. No. 12/019677, and filed on even date herewith, the disclosure of which is incorporated by reference herein in its entirety.

FIELD OF THE INVENTION

The present invention generally relates to information technology, and, more particularly, to monitoring transactions.

BACKGROUND OF THE INVENTION

There are existing approaches for monitoring enterprise systems at infrastructure, application, and enterprise levels. In the domain of network management, there are existing approaches that provide a range of monitoring capabilities for network security, performance, connectivity and topology. Also, other approaches include application monitoring tools that track availability and application performance through simulated end-user transactions.

Existing approaches also include enterprise intelligence tools that support data integration, analysis and reporting, and help managers monitor the overall health of the enterprise. Additional approaches include integrated monitoring capabilities across different levels.

However, the existing approaches do not provide a general-purpose management infrastructure that can track end-to-end transactions in a real-time network. A number of existing approaches are domain-specific in nature. There are thus several versions of IBM Tivoli composite application management (ITCAM) customized for different environments such as, for example, service-oriented architecture (SOA), Websphere, and java platform, enterprise edition (J2EE), which make use of a variety of product/protocol/domain-specific information and application response measurements (ARM) instrumentation to track transaction status. Similarly, other approaches provide stand-alone hypertext transfer protocol (HTTP) server performance monitoring, and/or depend on in-built correlators and startlend tokens to tie related transaction steps, and/or provide only response-time data of network transitions.

SUMMARY OF THE INVENTION

Principles of the present invention provide techniques for monitoring transaction instances.

An exemplary method (which may be computer-implemented) for monitoring one or more transaction instances in a real-time network, according to one aspect of the invention, can include steps of obtaining one or more system log files, wherein one or more footprints left by one or more transaction instances are recorded in the one or more system log files, obtaining a transaction model, wherein the transaction model comprises one or more transaction steps and a footprint pattern corresponding with each transaction step, and using the one or more system log files and the transaction model to monitor the one or more transaction instances in a real-time network at least one of an individual level and one or more aggregate levels.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1B is a diagram illustrating an ATM transaction model, according to an embodiment of the present invention;

FIG. 4 is a diagram illustrating engine logic, according to an embodiment of the present invention;

FIG. 5 is a diagram illustrating agent logic, according to an embodiment of the present invention;

FIG. 6 is a diagram illustrating an exemplary sequence of records and states of active transaction instances, according to an embodiment of the present invention;

DETAILED DESCRIPTION OF PREFERRED EMBODIMENTS

Figure 1A:
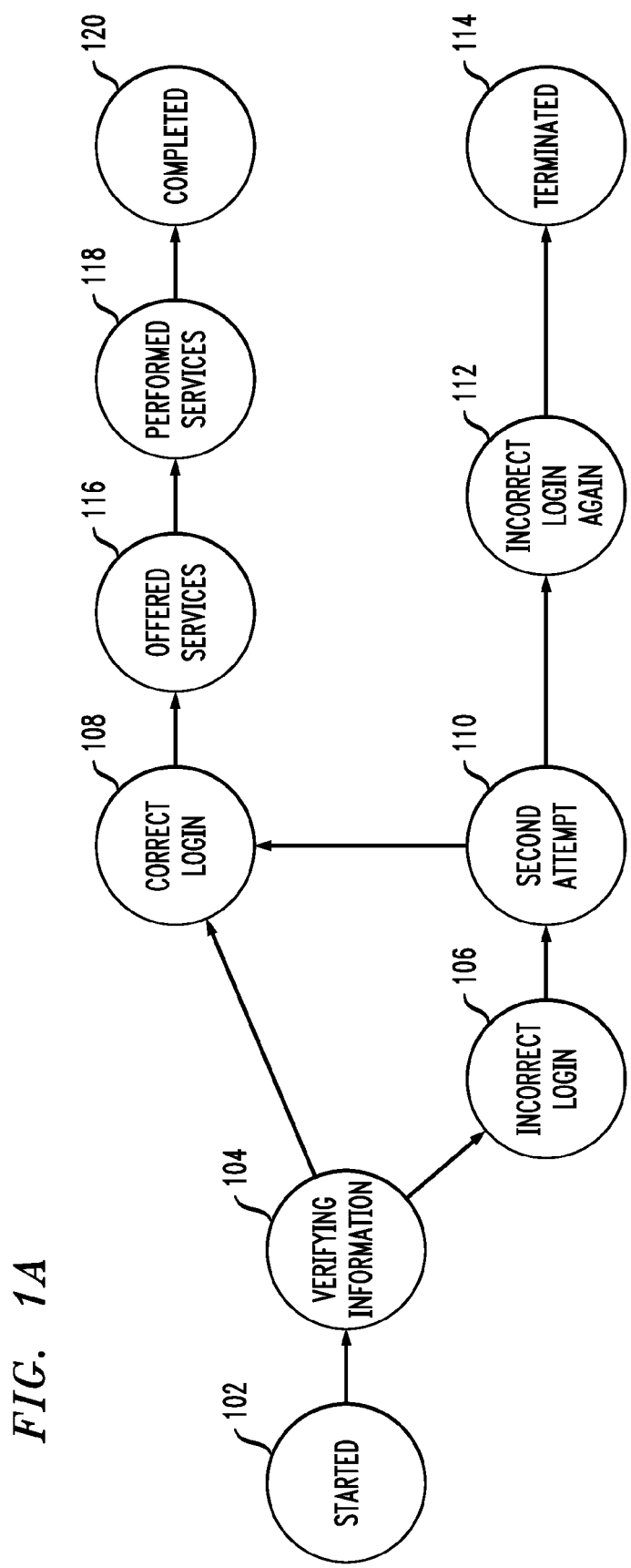
FIG. 1A is a diagram illustrating an automated teller machine (ATM) transaction model, according to an embodiment of the present invention.

Principles of the present invention include a general-purpose management infrastructure that can track and/or monitor end-to-end transactions in a real-time network. As described herein, principles of the present invention also include monitoring at an individual or instance level as well as monitoring at an aggregate level. In individual or instance level monitoring, the possible states of each transaction instance are determined along with the probability of an instance being at any possible state. In aggregate level monitoring, bounds of the number of transaction instances at any given state of the model are determined.

One or more embodiments of the invention are domain-agnostic, and include an input of system log files, where footprints left by ongoing transaction instances are recorded, and an input of a model of the transaction, in terms of the transaction steps, as well as the expected footprint patterns of each step.

For each ongoing transaction instance, a set of possible states that the instance may be in is determined in real-time, along with an expected probability of the instance being in any such possible state. In addition, as noted above, aggregate-level information such as, for example, bounds on the number of instances at any given state of the model, may also be determined in real-time.

Unlike existing approaches, principles of the present invention do not assume the presence of transaction instance-specific tokens (for example, identifiers, ARM instrumentation, etc.) in the footprints. When several transaction instances are executing concurrently, transaction instance-specific tokens allow a generated log record sequence to be mapped to a specific state of a unique ongoing transaction instance. One or more embodiments of the present invention, however, are advantageously tailored to make use of such tokens when present, and in their absence, to determine the set of "possible" states (and a probability of being in a particular state) an instance may be in, at any point in time.

As described herein, principles of the present invention include a transaction model that is used to drive a monitoring approach. The transaction monitoring approach, according to one or more embodiments of the invention, is based on a model of the transaction that captures the different steps (or states) that transaction instances pass through, along with the expected footprint patterns at each step.

In one or more embodiments described herein, it is assumed that a state-machine-based model of transaction is in use, wherein each state is annotated with an expected footprint pattern produced by the transaction at that state. However, as would be evident to anyone skilled in the relevant art, one or more embodiments of the invention may be easily tailored to other representations such as, for example, Petri Nets, business process execution language (BPEL), etc., that are implicitly state-based.

The transaction models may be obtained, for example, from knowledgeable users (for example, system administrators) or discovered from system logs using log clustering and workflow mining techniques.

A footprint pattern can include, for example, <pattern> and <location>. <location> represents the complete path information (server, directory and log name) where a record that matches <pattern> is produced. <pattern> may be thought of as a regular expression involving constants, variable words with associated types, and arbitrary strings.

For example, consider the pattern P1="Starting transaction <t_id:Int>* for user <name:String>", which may be the footprint of the starting state of a transaction model T. The pattern includes constant words such as "starting," "transaction," etc., as well as variables or tokens such as the integer "t_id" (transaction id) and the string "name," and arbitrary strings that may appear in place of *. A record such as R1="Starting transaction 103 from ATM221 for user John" will be considered as a "matching" record for the above pattern, while records that do not have the constant words and variables in correct sequence and/or types will not match the pattern.

Because token values in a footprint pattern may be a function of other token values (for example, they are used in other footprint patterns of the model), a pattern will also allow tokens to be defined as functions of other tokens. Thus, for example, P2="Logging <log_id: <name>+"#"+<t_id>> as reference number" may be the pattern of a subsequent state in the transaction model T, where the value of the token "log_id" for a transaction instance is obtained by concatenating the token value for "name," with "#" and the token value for "t_id" (where "name" and "t_id" are defined in P1) for that instance. A record such as R2="Logging John#ATM221 as reference number" will then match P2, and may be attributed to the transaction instance(s) that generated R1.

As described herein, one or more embodiments of the present invention are domain-independent, and advantageously require only a transaction model and access to logs where transaction footprints are created. No assumptions are made about the existence of transaction identifiers. In the absence of such identifiers, the exact state of a transaction may not be known, and the possible states of a transaction instance can be estimated along with the probabilities of each possible state using algorithms described herein.

In one or more embodiments of the invention, concurrent transaction instances can be individually tracked, even in the absence of instance-specific correlation information in footprints. Precision of reported results can depend on the level of instance-specific information in footprints, but probabilistic estimates may be easily used to fine-tune reporting. One or more embodiments of the present invention also determine bounds on the number of transaction instances at a given state of the model at any point in time, even in the absence of transaction identifiers.

FIG. 1A is a diagram illustrating an automated teller machine (ATM) transaction model, according to an embodiment of the present invention. By way of illustration, FIG. 1A depicts a state machine that illustrates a typical ATM transaction. From the initial state 102 ("Started"), the system moves to the state 104 where the user log-in information is verified ("Verifying Information"). The result is either state 108 "Correct Login," if the log-in information is correct, or state 106 "Incorrect Login" otherwise.

In the case of a correct log-in, a set of services is offered to the user in state 116 ("Offered Services"), selected services are performed in state 118 ("Performed Services"), and the transaction is completed at state 120 ("Completed"). In the case of an incorrect log-in, the user gets a second chance in state 110 ("Second Attempt") to correctly log-in. If the retry succeeds, then the transaction proceeds as for correct log-in above, otherwise state 112 ("Incorrect Login Again"), the transaction is terminated at state 114.

FIG. 1B is a diagram illustrating an ATM transaction model 150, according to an embodiment of the present invention. By way of illustration, FIG. 1B depicts footprints that are associated with different states of an ATM state machine, using the format <state-name>:<pattern>:<location>. Thus, the footprint pattern of the state "Started" is "Starting transaction <id>," whose instances appear in log ATM1.log. The footprint contains a token "id," which also appears in some (but not all) of the footprints of the subsequent states. For purposes of simplicity, the token types (assume "id" to be a string) and the path-information (server name, directory) of the log files are not depicted herein. For the same reason, although it is assumed that each log record carry a timestamp, a placeholder for the same has not been included in the sample footprint patterns in FIG. 1B.

During monitoring, as ATM transactions execute, instances of the different footprints will appear in the corresponding log files (for example, ATM1.log or ATM2.log). When there are multiple transaction instances executing, their footprints may interleave. As described herein, one or more embodiments of the present invention monitor these log files in real-time, and match generated log records with expected footprints (as captured in the transaction model) of ongoing transaction instances to determine the possible states in which these transaction instances may be present.

Figure 2:
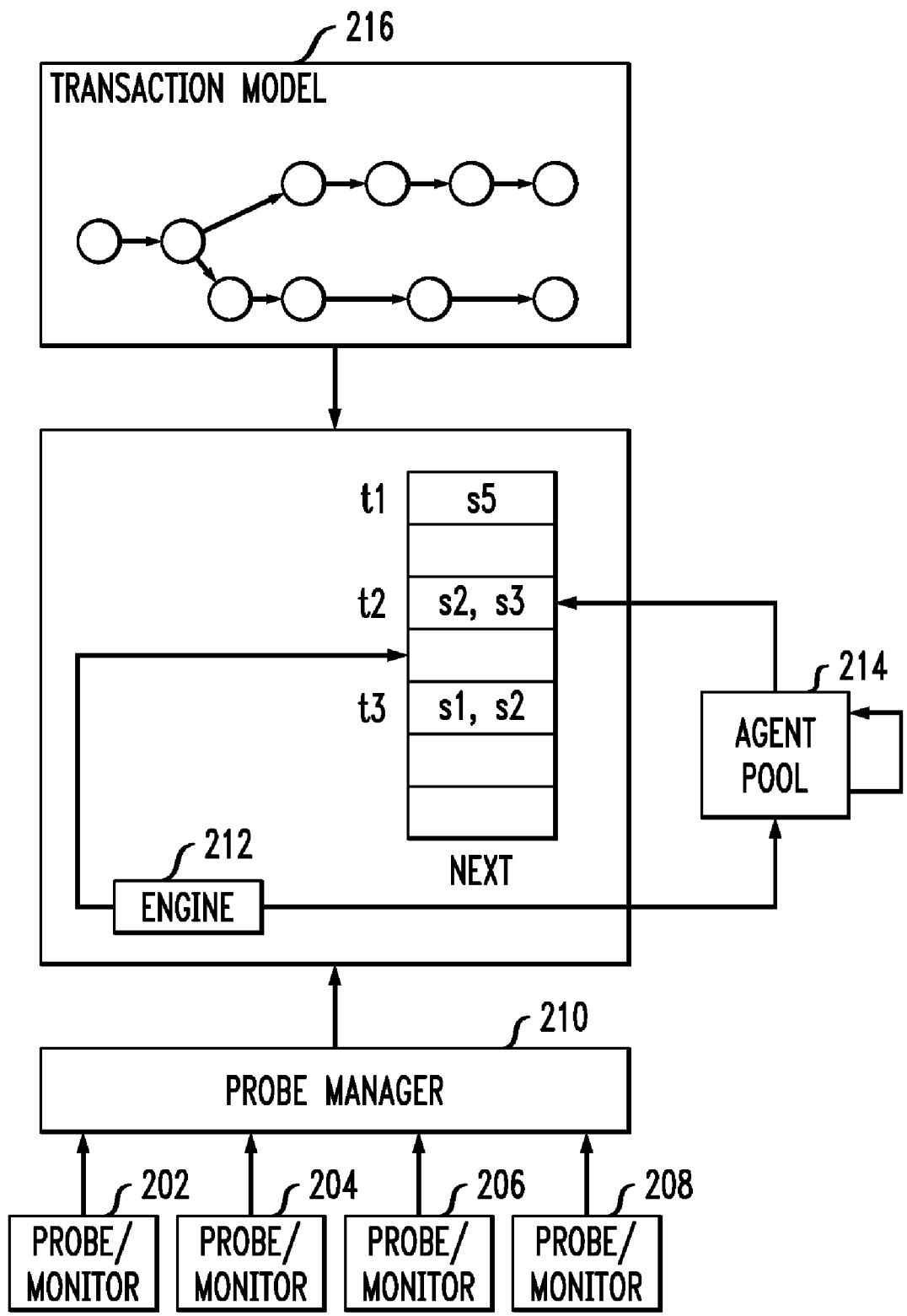
FIG. 2 is a diagram illustrating monitoring system architecture, according to an embodiment of the present invention.

FIG. 2 is a diagram illustrating monitoring system architecture, according to an embodiment of the present invention. By way of illustration, FIG. 2 depicts a diagrammatic representation of the architecture for monitoring transactions at an individual or instance level, including three components identified as probe manager 210, engine 212 and agent pool 214.

During execution, transaction instances leave footprint records in system log files. For each such log file, a probe is installed. A probe (such as for example, 202, 204, 206 and 208) attached to a log file reads log records as they appear in the file, and forwards the same to a probe manager 210 using a remote communication facility such as, for example, a remote method invocation (RMI), pub-sub messaging, etc.

The probe manager 210 sorts records sent by different probes in real time according to the record timestamps, and forwards a sorted sequence of log records to the engine 212. In case the clocks of the concerned servers are not in sync, the probe manager may introduce necessary offsets in the record timestamps during sorting.

The engine 212 determines candidate agents, forwards log records to the candidate agents in the agent pool 214, or creates a new agent. The agent pool 214 determines and updates the next state and/or table. Additionally, the architecture depicted in FIG. 2 also includes a transaction model 216.

Figure 3:
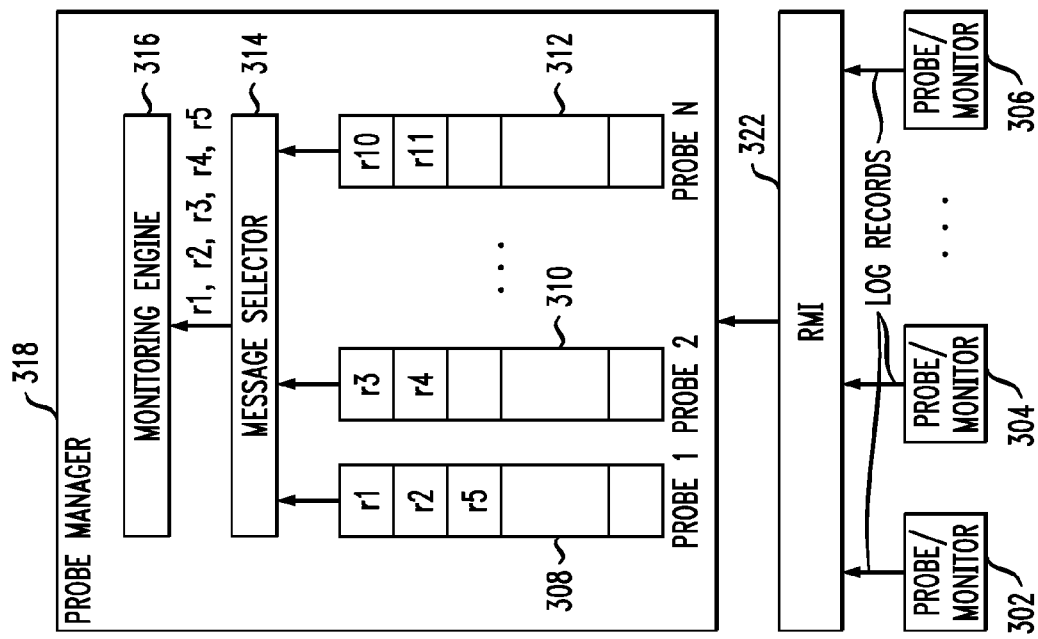
FIG. 3 is a diagram illustrating probe manager architecture and logic, according to an embodiment of the present invention.

FIG. 3 is a diagram illustrating probe manager architecture and logic, according to an embodiment of the present invention. The probe manager 318 maintains a queue for each of the probes (for example, 308, 310 and 312) to keep sorted records received from each one of them. The algorithm 320 depicted in FIG. 3 is executed to get a sequence of records sorted according to their timestamps in real-time. In one or more embodiments of the invention, an assumption is made that the records sent by each of the probes (for example, 302, 304 and 306) are already sorted according to their timestamps. Correspondingly, this would also make the records in each of the queues in the probe manager also sorted according to their timestamps.

The probe manager algorithm 320 selects the queue (for example, MinQueue), which has the record with the lowest timestamp at its head (for example, line 2), and sends all of the records in the queue to the transaction monitoring engine until there is another queue with a record having a lower timestamp (for example, line 3). If a MinQueue becomes empty, then the probe manager waits in anticipation of some more records arriving at the queue with timestamps lower than all of the records in the other queues. After a suitable timeout period, a new MinQueue is selected following the same methodology, and the above the procedure is repeated.

Additionally, FIG. 3 depicts a remote method invocation (RMI) 322, a message selector 314 and a monitoring engine 316.

FIG. 4 is a diagram illustrating engine logic 402, according to an embodiment of the present invention. The algorithm that governs the behavior of the engine is depicted in FIG. 4. On reception of a log record sequence from the probe manager (for example, line 2), the engine checks if the record matches the footprint pattern of an initial state of the transaction model M. This is done, for example, by calling the function is StartingRecord(M,r) on line 3. If there is a match, then it indicates the start of a new transaction instance. The engine generates a new identifier (id) to track this instance (for example, line 4), and creates a new agent (for example, adding to the agent pool in FIG. 2) that is responsible for monitoring the progress of this new instance (for example, line 5).

The engine also creates an entry in the next table (as seen, for example, in FIG. 2) for this new instance. This entry consists of the id, the next expected states of this instance, and token bindings (for example, line 6). The next expected states are obtained from the transaction model M, by considering the states that follow the initial state. The token bindings are obtained while matching the log record sequence with the footprint pattern. Thus, if the footprint pattern is "Starting transaction <id>" and the log record is "Starting transaction 1," then the token id is bound to the value one for this transaction instance.

In case record r does not match the footprint of an initial state, but matches the footprint of some other state (for example, state s) in model M (for example, line 7), then r may have been generated by one of the existing transaction instances. In this case, the engine scans the next table (for example, line 8) and determines the set of candidate transaction instances that may have generated r. This is obtained by considering those transaction instances whose next expected states include s, and whose token bindings satisfy the token values (if any) in r.

The one or more agents associated with these candidate transaction instances are called candidate agents. The token bindings may also be updated, if needed, to account for new tokens and/or values. Each of the candidate agents corresponding to the candidate transaction instances are forwarded the state s along with information (for example, identifiers) of all the candidate instances for r (for example, line 9). As described herein, each candidate agent computes the set of possible states in which the corresponding transaction instance may be, and updates the next table accordingly (for example line 10). The engine may then read the next record sent by the probe manager.

Also, the engine may periodically compress the next table by removing transaction instances that have reached end states (and thus have no "next" states in the next table). The engine may additionally destroy corresponding agents (for example, line 11). Also, the agents corresponding to active transaction instances may be polled periodically to obtain the current possible states of those instances, and the information may be logged in an appropriate repository (for example, line 12).

FIG. 5 is a diagram illustrating agent logic 502, according to an embodiment of the present invention. The agent pool includes a set of agent threads, one for each ongoing transaction instance. To support scalability, the agents may be distributed across several machines, thereby allowing them to process an input (for example, from the engine) in parallel. An agent is responsible for tracking the states of the associated transaction instance as the instance executes. At any point in time, an instance may be in a set of "possible states" that is maintained by the agent. The logic underlying the agent behavior is described herein.

Upon creation of an agent, the set of possible states is set to the initial state of the model (for example, line 1). Also, the agent may receive, from the engine, a state s that is listed as a possible next state of the agent (that is, associated transaction instance) in the next table. The agent also receives the list of candidate agents A (for example, line 3). If s is not in the set of possible states of the agent (for example, line 4) and if the agent is the only candidate (for example, line 5), then the agent/instance must be in the state s (for example, line 6). Otherwise, if there are other candidate agents, the agent creates a history object "History(s)" to keep track of this contention.

The history object includes the number of times that the agent has received the state s. This is represented as History(s).cnt and initially set to 1 (for example, line 8). The history object also includes the set of all candidate agents of state s. This is represented as History(s).candidates, and initialized to A (for example, line 9). Additionally, s is included as a possible state by the agent (for example, line 10).

If s is already listed as a possible state of the agent (for example, line 11), then History(s).cnt is incremented by one to account for the new input (for example, line 12). History(s).candidates is also updated to include any new candidate agents (for example, line 14). If History(s).cnt equals the cardinality of History(s).candidates (for example, line 15), that indicates that as many instances of s have been received by the agent as there are number of contenders. Thus, one footprint must have been produced by the instance being tracked by the agent. That is, the instance must have reached s at some point during execution.

In such a case, the agent updates the set of possible states by removing any state that precedes s (because such a state has already been passed) and any state unreachable from s (because s has definitely been reached at some point during execution, any state unreachable from s can no longer be a possible state) (for example, lines 16, 17). This reasoning is applicable, for example, when the state s can only arise once per transaction instance execution (that is, s is not part of any cycle) (for example, line 15). Otherwise, the equality on line 15 need not necessarily indicate that each contender has reached state s. The equality on line 15 may also indicate, for example, that some contender(s) has traversed s multiple times.

If state s is part of a cycle, then History(s) need not be maintained, but need only be recorded as a possible state of the agent until one (for example, a user) receives definitive evidence of the agent having reached a different state (for example, through lines 5, 6 or lines 15, 16, or 17 for a state s' that is not part of a cycle.) The set of next expected states ST is also computed (for example, line 18). ST will include any state that immediately follows a state in the current set of possible states. Furthermore, the agent updates the next table to record ST as the set of next states that the particular transaction instance may reach (for example, line 19).

An agent can also provide an estimate of the probability of a possible state s. If s is the only possible state, then its probability is one. Otherwise, for a possible state s, let History(s).cnt=N1 and |History(s).candidates|=N2. Also, a weight, wt(s), is assigned to s such that wt(s)∝N1/N2 (that is, wt(s) is proportional to N1/N2). By normalizing the weights over all possible states, an estimate of the probability of each individual state can be obtained. Therefore, if the set of possible states maintained by an agent is P, then an estimate of the probability of a state s in P may be given by:

$$prob(s) \propto wt(s) \Big/ \sum_{s' \in P} wt(s').$$

It should be appreciated by one skilled in the art that this is only one possible estimate. Heurisitc-based techniques, for example, may also be used to refine and/or compute such estimates (for example, time-based heuristics which consider the order in which transaction instances start or reach a given state to determine probability of current states).

As described herein, one or more embodiments of the present invention include monitoring transactions at an aggregate level. In the absence of tokens in the footprints, the set of possible states for a transaction instance may continue to grow. The precision of the per-instance reported results may decrease when the transaction traffic load increases, as there may be many candidates for any given log record.

In such cases, it is advantageous to complement the methodology described above with techniques that provide aggregate information in terms of bounds on the number of transaction instances at a given state of the model, at any point in time. As such, assume that there is a counter associated with each state (initialized to 0), and it is incremented by one each time an instance of the state's footprint is encountered.

The transaction model can be, for example, acyclic, in which case, for state $s_i$, the count $c_i$ will give the number of instances that reached and/or passed through $s_i$ during execution. Let $x_i$ be the number of instances currently in state $s_i$. As such, $\max(0,X) \leq x_i \leq \min(Y,Z)$, where, $$X = c_i - \sum_{s_j \to s} c_j,$$

$$Y = \sum_{s_j \in P(s_i)} c_j - \sum_{s_k \in C(s_i)} c_k, \text{ and } Z = c_i - \sum_{\substack{s_i \to s_k \\ \neg \exists\, p \neq i, s_p \to s_k}} c_k$$

X is derived from the observation that the maximum number of instances that may have moved out from a state is the total number of instances that reached all of its successor states. Z follows from the fact that the minimum number of instances that have definitely moved out from a state is the total number of instances that have reached those successor states which have no other predecessors. X and Z will be the same for a state that is the only predecessor of its successors (for example, all states in FIG. 1A excluding states "Verifying Information" and "Second Attempt").

One or more embodiments of the invention include determining a sub-model containing $s_i$ such that it has a set of initial states $P(s_i)$ (through which instances flow into the sub-model) and a set of final states $C(s_i)$ (through which instances flow out of the sub-model), with none of the initial states (or final states) reachable from each other. Y, as such, is the difference between the total number of instances that reached the initial states and the total number of instances that reached the final states. Y also represents the number of instances currently in the sub-model, which is an upper bound for $x_i$.

To compute $P(s_i)$ and $C(s_i)$, find the immediate successors of state $s_i$, backtrack to all their immediate parents, and find all their immediate successors and so oil until no new state can be added. If for states $s_1$ and $s_2$ in $P(s_i)$, $s_2$ is reachable from $s_1$, then $s_2$ is not a true initial state, and it is replaced by its predecessors. Similarly, for states $s_3$ and $s_4$ in $C(s_i)$, if $s_4$ is reachable from $s_3$, then $s_3$ is not a true final state, and it is replaced by its successors. If a state appears both in $P(s_i)$ and $C(s_i)$, it is removed.

This process is continued until none of the states in $P(s_i)$ (as also $C(s_i)$) are reachable from each other. In the limit, $P(s_i)$ and $C(s_i)$ may become the set of initial and final states, respectively, of the overall transaction model, and Y is the total number of ongoing transaction instances.

The aggregate transaction information is maintained by an engine component (referred to herein as an aggregator). To maintain bounds (without having to support unbounded counters), for each state s in the model, the aggregator maintains a tuple $[s_{min}, s_{max}]$, wherein $s_{min}$ and $s_{max}$ denote, respectively, the minimum and maximum number of transaction instances at s at any given point in time. Initially, $s_{min}$ and $s_{max}$ are set to 0. For each state s, the sets P(s) and C(s) are also pre-computed, and a counter $c_{ong}(s)$ is initialized to 0.

Each time a footprint for a state in P(s) is received, the aggregator increments $c_{ong}(s)$ by one. Conversely, each time a footprint for a state in C(s) is received, $c_{ong}(s)$ is decremented by one. When the engine receives a log record sequence that matches the footprint of s, the aggregator does the following:

increment both $s_{min}$ and $s_{max}$ by one;

if state s has a single parent s', and $s'_{min} \geq 1$, then decrement $s'_{min}$ and $s'_{max}$ both by one;

if state s has a set of parents S where $|S|>1$, then for any s' in S, if for all other parents s" in S we have $s''_{max}=0$, then decrement $s'_{max}$ by one (otherwise, leave $s'_{max}$ unchanged);

for any s' in S, if $s'_{min} \geq 1$, decrement $s'_{min}$ by one;

If $q_{max} > c_{ong}(q)$ for any state q in the model, set $q_{max} = c_{ong}(q)$.

With respect to issues of complexity, N can be, for example, the number of states in the transaction model, T the maximum number of transaction instances that may execute concurrently, V the maximum number of tokens in any footprint pattern, and L the maximum length of a log record. Although the exact time complexity of monitoring may depend on the way (for example, the data structures used) the above algorithms are implemented, it may be shown that the steps can be performed in a time that is polynomial in variables from the set $\{N, T, V, L\}$.

In FIG. 4, for example, lines 3 and 7 involve matching a log record with one or more footprint patterns, each of which can be done in O(L). Line 8 involves identification of candidate agents, and can be performed in O(N*T*V), because there can be at most T entries in the next table, an each instance may have at most N next states and V number of matches with existing token values. Line 9, for example, may be performed in O(T).

Turning to FIG. 5, it can be noted that the total execution time over all agents may be brought down substantially by distributing the agents over separate machines, thereby allowing their execution to proceed in parallel. For a single agent, for example, line 4 can be performed in constant time using a hash table to store possible states, or O(N) times otherwise. Line 14 is achievable in O(T) using a hash table to store candidates for a state. Also, line 16 involves a reachability analysis on the transaction model. Because reachability results for each state can be pre-computed and stored during execution, this may be performed in constant time. The same holds true for Line 18, which can be performed in O(N) time. Additionally, the update of the next table (for example, line 19) can be performed in O(T) considering all agents.

In terms of space, the next table requires O(T*N*V), because for each agent, next possible states and token bindings are stored. The agent will require O(N*T) space to store possible states and corresponding candidate information.

For a probe manager, the time taken in each cycle to determine the MinQueue is O(Q), where Q is the number of probes in the system and hence the number of queues maintained by the probe manager. The flushing operation for each queue is O(S), where S is the size of each queue. Theoretically S can be unbounded, but it is typically limited by the physical limitation of the systems and is generally engineered for some practical value. Therefore, in each cycle, the probe manager operation can take O(k+Q+S), where k is some constant corresponding to the constant time that the probe manager waits when one of the queues become empty.

Also, for aggregate level monitoring, when a log record sequence is received, the computation bounds on the number of transaction instances at a state requires O(N).

FIG. 6 is a diagram illustrating an exemplary sequence of records and states of active transaction instances, according to an embodiment of the present invention. By way of illustration, FIG. 6 depicts an exemplary run on ATM transaction instances 602, wherein the transaction model is shown in FIG. 1. In FIG. 6, a sequence of records (preceded by >, and numbered for reference) is presented, and following each record, the possible states of active transaction instances are shown.

As illustrated in FIG. 6, records 1 and 2 match the footprint pattern of the initial state "Started" of the ATM model. As a result, two new agents are created (as represented by the automatically generated tags shown), with the id token bound to 1 and 2 respectively. Both of these agents are in the state "Started." When record 3 comes in, it is seen to correspond to state "Verifying Information," which is a next expected state of both agents. Hence, "Verifying Information" becomes a possible state of both the existing agents.

A probability can also be assigned to each state using alternate procedures outlined above. For the first agent, a weight of 1 can be assigned to state "Started," and a weight of 0.5 can be assigned for "verifying Information" (because there is one record with two candidates). Therefore, after normalizing, probabilities of 0.67 and 0.33 may be assigned to "Started" and "Verifying Information," respectively. The same holds true for the second agent.

When record 4 is read, both agents move to state "Verifying Information." Because the footprint of this state has occurred twice (records 3 and 4), with two candidates, each instance must have generated one footprint, and thus have definitely reached state "Verifying Information." This means that the two instances can no longer be in state "Started" (for example, refer to line 16, FIG. 5). Two new agents, with id values 3 and 4, are created on receipt of records 5 and 6, and they add "Verifying Information" as a possible state on receiving record 7. When record 8 comes in, the value of token id is 4. Therefore, the fourth agent is the only candidate, and it moves to the state "Incorrect Login."

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
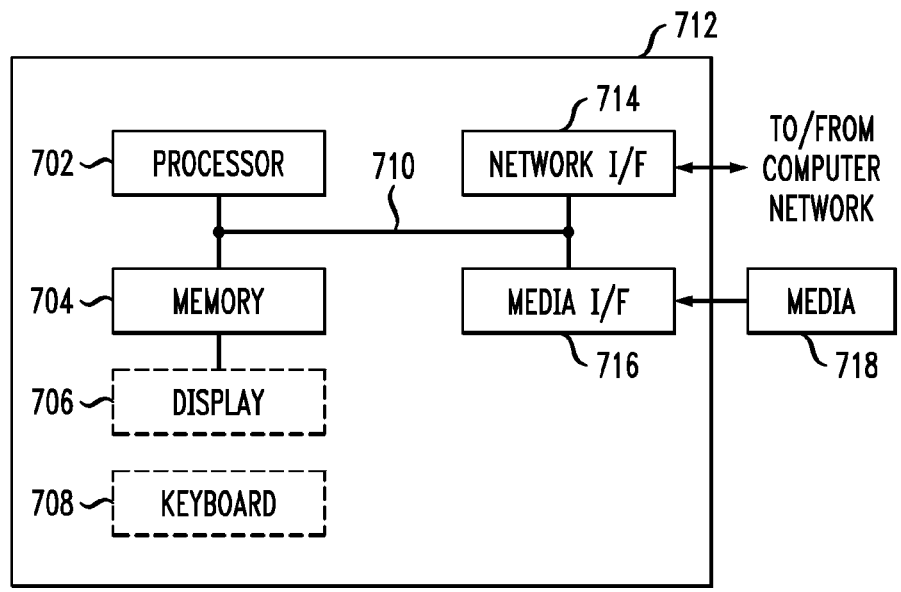
FIG. 7 is a system diagram of an exemplary computer system on which at least one embodiment of the present invention can be implemented.

At present, it is believed that the preferred implementation will make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712.

Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Figure 8:
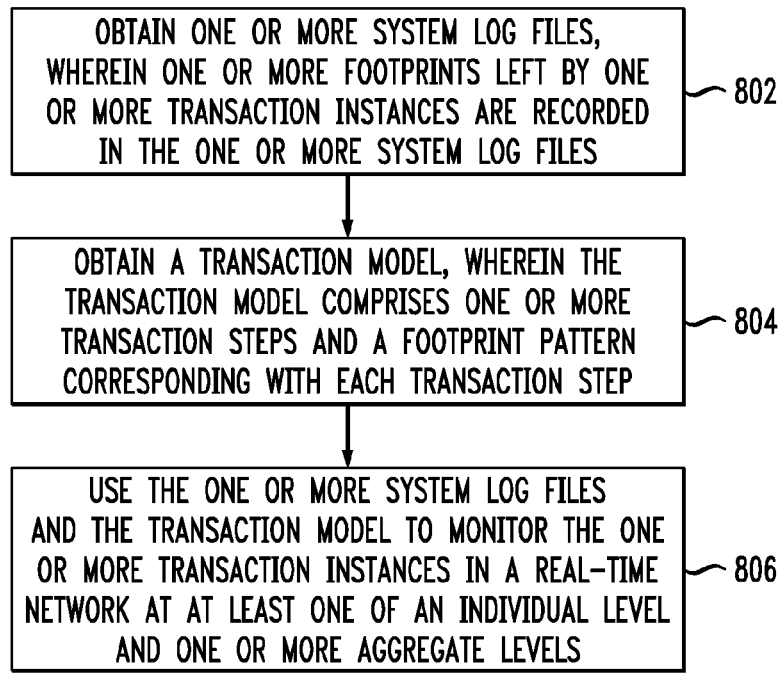
FIG. 8 is a flow diagram illustrating techniques for monitoring one or more transaction instances in a real-time network, according to an embodiment of the present invention.

FIG. 8 is a flow diagram illustrating techniques for monitoring one or more transaction instances in a real-time network, according to an embodiment of the present invention. Step 802 includes obtaining one or more system log files, wherein one or more footprints left by one or more transaction instances (for example, two or more concurrent transaction instances) are recorded in the one or more system log files. The transaction instances can be, for example, ongoing or already-executed. Step 804 includes obtaining a transaction model, wherein the transaction model comprises transaction steps and a footprint pattern corresponding with each transaction step. Footprint patterns can include, for example, a representation of complete path information and a regular expression involving at least one of constants, variable words with associated types, and arbitrary strings.

Step 806 includes using the one or more system log files and the transaction model to monitor the one or more transaction instances in a real-time network at least one of an individual level and one or more aggregate levels.

Monitoring transaction instances at an individual level may include, for example, determining a set of possible states of each transaction instance and a probability of each instance being at each of the possible states. Also, monitoring transaction instances at one or more aggregate levels may include, for example, determining one or more limits on a number of transaction instances at a given state of a transaction model.

A transaction model may be provided by a user (for example, a system administrator). A transaction model may be discovered from system logs via the use of log clustering and/or workflow mining techniques.

As detailed herein, one or more embodiments of the present invention also include a system for monitoring one or more transaction instances in a real-time network. The system may include, for example, a probe manager, an engine and an agent pool. A probe manager sorts records sent by probes in real-time according to corresponding timestamps to create a sorted log record sequence. An engine receives the log record sequence from the probe manager, determines if the log record sequence matches a footprint pattern of a state in a transaction model and creates an output.

If the log record sequence matches the footprint pattern of an initial state of the transaction model, the engine indicates a start of a new transaction instance and creates a new agent to monitor the new transaction instance. If the log record sequence does not match the footprint pattern of an initial state, but matches a footprint of a different state in the transaction model, the engine determines a set of candidate transaction instances that may have generated the log record sequence. If the log record sequence matches the footprint pattern of a state in the transaction model, the engine increments by one a minimum and maximum possible number of transaction instances at that state in the transaction model, and re-computes a minimum and maximum possible number of transaction instances at one or more other states in the transaction model.

An agent pool includes a set of agents that process an output from the engine and monitor one or more states of an associated transaction instance as the instance executes. The set of agents can be, for example, distributed over two or more machines and process an input in parallel. Each agent may also maintain execution history data for the associated transaction instance over one or more transaction model states and determine possible states of the transaction instance and a probability of the transaction instance being at each state.

Also, as described above, theoretical bounds on a number of transaction instances at any state of the transaction model can be developed.

At least one embodiment of the invention may provide one or more beneficial effects, such as, for example, being platform-agnostic, thereby requiring only a transaction model and access to logs where transaction footprints are created.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for monitoring one or more transaction instances in a real-time network, wherein the system comprises distinct software modules, each of the distinct software modules being embodied on a tangible computer-readable recordable storage medium, and wherein the distinct software modules comprise:
a probe manager executing on a hardware processor, wherein the probe manager sorts one or more records sent by one or more probes in real-time according to one or more corresponding timestamps to create a sorted log record sequence;
an engine executing on a hardware processor, wherein the engine receives the log record sequence from the probe manager, determines if the log record sequence matches a footprint pattern of a state in a transaction model and creates an output; and
an agent pool executing on a hardware processor, wherein the agent pool comprises a set of agents that process an output from the engine and monitor one or more states of an associated transaction instance as the instance executes.

2. The system of claim 1, wherein if the log record sequence matches the footprint pattern of an initial state of the transaction model, the engine indicates a start of a new transaction instance and creates a new agent to monitor the new transaction instance.

3. The system of claim 1, wherein if the log record sequence does not match the footprint pattern of an initial state, but matches a footprint of a different state in the transaction model, the engine determines a set of candidate transaction instances that may have generated the log record sequence.

4. The system of claim 1, wherein the set of agents are distributed over two or more machines and process an input in parallel.

5. The system of claim 1, wherein each agent maintains execution history data for the associated transaction instance over one or more transaction model states and determines one or more possible states of the transaction instance and a probability of the transaction instance being at each state.

6. The system of claim 1, wherein if the log record sequence matches the footprint pattern of a state in the transaction model, the engine increments by one a minimum and maximum possible number of transaction instances at that state in the transaction model, and re-computes a minimum and maximum possible number of transaction instances at one or more other states in the transaction model.

7. The system of claim 1, wherein one or more theoretical bounds on a number of transaction instances at any state of the transaction model are developed.

8. A computer program product comprising a tangible computer readable recordable storage medium having computer useable program code for monitoring one or more transaction instances in a real-time network, said computer program product including:
computer useable program code for obtaining one or more system log files, wherein one or more footprints left by one or more transaction instances are recorded in the one or more system log files;
computer useable program code for obtaining a transaction model, wherein the transaction model comprises one or more transaction steps and a footprint pattern corresponding with each transaction step; and
computer useable program code for using the one or more system log files and the transaction model to monitor the one or more transaction instances in a real-time network at least one of an individual level and one or more aggregate levels.

9. The computer program product of claim 8, wherein the computer useable program code for using the one or more system log files and the transaction model to monitor the one or more transaction instances at an individual level comprises computer useable program code for determining a set of one or more possible states of each transaction instance and a probability of each instance being at each of the one or more possible states.

10. The computer program product of claim 8, wherein the computer useable program code for using the one or more system log files and the transaction model to monitor the one or more transaction instances at one or more aggregate levels comprises computer useable program code for determining one or more limits on a number of transaction instances at a given state of a transaction model.

11. The computer program product of claim 8, wherein the footprint pattern comprises at least one of a representation of complete path information and a regular expression involving at least one of constants, variable words with associated types, and arbitrary strings.

12. A system for monitoring one or more transaction instances in a real-time network, comprising:
a memory; and
at least one processor coupled to said memory and operative to:
obtain one or more system log files, wherein one or more footprints left by one or more transaction instances are recorded in the one or more system log files;
obtain a transaction model, wherein the transaction model comprises one or more transaction steps and a footprint pattern corresponding with each transaction step; and
use the one or more system log files and the transaction model to monitor the one or more transaction instances in a real-time network at least one of an individual level and one or more aggregate levels.

13. The system of claim 12, wherein the at least one processor coupled to said memory and operative to use the one or more system log files and the transaction model to monitor the one or more transaction instances at an individual level is further operative to determine a set of one or more possible states of each transaction instance and a probability of each instance being at each of the one or more possible states.

14. The system of claim 12, wherein the at least one processor coupled to said memory and operative to use the one or more system log files and the transaction model to monitor the one or more transaction instances at one or more aggregate levels is further operative to determine one or more limits on a number of transaction instances at a given state of a transaction model.

15. The system of claim 12, wherein in the footprint pattern comprises at least one of a representation of complete path information and a regular expression involving at least one of constants, variable words with associated types, and arbitrary strings.

* * * * *